(12) United States Patent
Chen et al.

(10) Patent No.: US 12,308,495 B2
(45) Date of Patent: May 20, 2025

(54) FUEL CELL FAULT DIAGNOSIS METHOD AND SYSTEM

(71) Applicant: Wuhan University of Technology, Hubei (CN)

(72) Inventors: Qihong Chen, Hubei (CN); Jisen Li, Hubei (CN); Ao Tian, Hubei (CN); Liyan Zhang, Hubei (CN); Dongqi Zhao, Hubei (CN); Liang Xie, Hubei (CN); Ze Zhou, Hubei (CN)

(73) Assignee: Wuhan University of Technology, Hubei (CN)

( * ) Notice: Subject to any disclaimer, the term of this patent is extended or adjusted under 35 U.S.C. 154(b) by 0 days.

(21) Appl. No.: 18/894,084

(22) Filed: Sep. 24, 2024

(65) Prior Publication Data

US 2025/0015323 A1    Jan. 9, 2025

(30) Foreign Application Priority Data

Apr. 30, 2024  (CN) .......................... 202410533425.2

(51) Int. Cl.
*H01M 8/04664* (2016.01)
*H01M 8/04298* (2016.01)
*H01M 8/04992* (2016.01)

(52) U.S. Cl.
CPC ... *H01M 8/04671* (2013.01); *H01M 8/04305* (2013.01); *H01M 8/04992* (2013.01)

(58) Field of Classification Search
CPC .... G01R 19/00; G01R 31/378; G01R 31/396; G06F 17/16; G06F 30/20; G07C 5/0808;
(Continued)

(56) References Cited

U.S. PATENT DOCUMENTS

2013/0269436 A1*  10/2013  Couse .................... G01N 29/12
                                                                73/579
2024/0297317 A1*   9/2024  Mao ................. H01M 8/04664

FOREIGN PATENT DOCUMENTS

CN        114048772 A     2/2022
CN        115221930 A    10/2022
(Continued)

OTHER PUBLICATIONS

Li, Jisen et al. "Spatial-temporal synchronous fault feature extraction and diagnosis for proton exchange membrane fuel cell systems." Energy Conversion and Management (2024): n. pag. (Year: 2024).*

(Continued)

*Primary Examiner* — Lisa M Caputo
*Assistant Examiner* — Eric Sebastian Von Wald

(57) ABSTRACT

The present disclosure provides a fuel cell fault diagnosis method and system. The method includes: determining key parameters for temporal feature and spatial feature extractions according to the amount of information contained in all sensor parameters in a fuel cell to be diagnosed; obtaining a target intrinsic mode function by performing complementary ensemble empirical mode decomposition on a temporal feature matrix; obtaining a high-dimensional mapping vector by processing spatial feature data using a kernel principal component analysis; and obtaining a spatial feature to be synchronized by processing the high-dimensional mapping vector according to a preset confidence interval, obtaining a temporal feature to be synchronized by processing a target decomposition result according to a lumped fuzzy entropy operation, fusing the spatial feature to be synchronized and the temporal feature to be synchronized, and obtaining a fault diagnosis result by inputting a synchronous spatial-temporal feature into a preset diagnosis model.

6 Claims, 6 Drawing Sheets

(58) Field of Classification Search
CPC ......... H01M 8/04753; H01M 8/04559; H01M 8/04552; H01M 8/04582; H01M 8/24; H01M 8/04305; H01M 8/04619; H01M 8/04679; H01M 8/04992; H01M 8/249; H01M 8/04589; H01M 8/04649; Y02E 60/50; Y02E 60/10; Y02T 10/70

See application file for complete search history.

(56) References Cited

FOREIGN PATENT DOCUMENTS

| | | | |
|---|---|---|---|
| CN | 116087787 A | 5/2023 | |
| CN | 116755000 A | 9/2023 | |
| CN | 117059844 A | 11/2023 | |
| CN | 117309377 A | 12/2023 | |
| CN | 118114101 B | 5/2024 | |

OTHER PUBLICATIONS

Yuan Tiejiang, Guo Zelin, Fang Tong. Proton Exchange Membrane Fuel Cell Fault Diagnosis Based on Operation Data Temporal and Spatial Characteristics and Stacking Ensemble Learning[J]. Proceedings of the CSEE, 2023, 43(14): 5461-5470. DOI : 10.13334/j.0258-8013.pcsee.220127 (Year: 2023).*

Chen, Jian & Huang, Lianghui & Yan, Chizhou & Liu, Zhiyang, 2020. "A dynamic scalable segmented model of PEM fuel cell systems with two-phase water flow," Mathematics and Computers in Simulation (MATCOM), Elsevier, vol. 167(C), pp. 48-64. (Year: 2020).*

Yang, Zhi-Xin, et al."Remaining useful life estimation combining two-step maximal information coefficient and temporal convolutional network with attention mechanism".IEEE Access (2021). (Year: 2021).*

* cited by examiner

FUEL CELL FAULT DIAGNOSIS METHOD AND SYSTEM

TECHNICAL FIELD

The present disclosure relates to the field of fuel cell fault diagnoses, in particular to a fuel cell fault diagnosis method and system.

BACKGROUND

A proton exchange membrane fuel cell (PEMFC) has become one of the most promising power generation apparatuses due to advantages of zero emission and high energy efficiency. However, the PEMFC is internally subject to coupling of multiple physical fields such as gas, water, electricity, and heat, and in addition, a PEMFC power generation system is internally equipped with complex auxiliary devices such as an air compressor and a humidifier, both of which significantly increase the difficulty of fault diagnosis. Therefore, high-performance fault diagnosis techniques are urgently needed in order to improve the reliability and durability of the PEMFC system.

At present, fuel cell fault diagnosis methods are mainly classified into two main types: physical model-based and data-driven based. In a physical model-based method, a numerical analysis model is established by means of hydrodynamics, electrochemistry, and a heat transfer mechanism within the system, and fault detection is realized by analyzing a residual between redundancy (predicted value) and a measured value. However, it is difficult to establish a fuel cell model that considers the coupling of multiple physical fields. A finite element model method is often used for depicting mass and heat transfer features inside the fuel cell, but its solution process takes too long, making it difficult to use for real-time control and diagnosis.

In a data-based diagnosis method, a reliable source of key parameters for the fuel cell is first needed, and voltage, pressure change rate, electrochemical impedance spectra, or a combination thereof are typically taken as the parameters. Then it is necessary to obtain fault features of the fuel cell through a feature extraction method. Finally the features are classified by applying machine learning methods such as a support vector machine and a decision tree, or deep learning methods such as a convolutional neural network and a long short-term memory network. Deep learning methods have high prediction accuracy, but because not every dimension of sensor data is necessary for fault diagnosis, too much redundant data is mixed in, resulting in a long training time, making it difficult to meet online diagnosis requirements.

SUMMARY

The present disclosure provides a fuel cell fault diagnosis method and system for performing a sensitivity analysis on information contained in a sensor, and eliminating a redundant part in the full-dimensional sensor, thereby reducing a calculation amount, and greatly improving computing efficiency, so as to realize online diagnosis requirements of a fuel cell.

In a first aspect, the present disclosure provides a fuel cell fault diagnosis method, including:

determining a sensor weight corresponding to each sensor according to each amount of information contained in all sensors in a fuel cell to be diagnosed, determining sensor data corresponding to all sensors having sensor weights greater than a first preset weight as temporal feature data, and determining sensor data corresponding to all sensors having sensor weights greater than a second preset weight as spatial feature data, wherein the first preset weight is greater than the second preset weight;

performing a temporal feature extraction on the temporal feature data according to a preset time series, obtaining a temporal feature matrix using a data interpolation, and obtaining a target decomposition result by performing complementary ensemble empirical mode decomposition on the temporal feature matrix obtaining a high-dimensional mapping vector by processing the spatial feature data using a kernel principal component analysis;

obtaining a spatial feature to be synchronized by processing the high-dimensional mapping vector according to a preset cumulative variance contribution, obtaining a temporal feature to be synchronized by processing the target decomposition result according to a lumped fuzzy entropy operation, and obtaining a synchronous spatial-temporal feature by fusing the spatial feature to be synchronized and the temporal feature to be synchronized; and obtaining a fault diagnosis result of the fuel cell to be diagnosed output by a preset diagnosis model by inputting the synchronous spatial-temporal feature into the preset diagnosis model; wherein Each amount of the information contained in all the sensors is determined according to correlation between data of any two sensors of all the sensors and a contrast.

The preset diagnosis model is obtained after training according to all spatial-temporal synchronization feature samples and a health state label corresponding to each spatial-temporal synchronization feature sample.

According to the fuel cell fault diagnosis method according to the present disclosure, determining the sensor weight corresponding to each sensor according to each amount of information contained in all the sensors in the fuel cell to be diagnosed includes a following formula:

$$W_i = C_i / \sum_{c=1}^{n} C_i$$

where $C_i = D_i \Sigma_{j=1}^{n}(1-r_{ij})$ is the amount of information contained in an $i^{th}$ sensor, $r_{ij}$ is correlation between data of any two sensors, and $D_i$ is a contrast between data of any one sensor.

According to the fuel cell fault diagnosis method according to the present disclosure, obtaining the target decomposition result by performing the empirical mode decomposition on the temporal feature matrix using the complementary set includes:

obtaining a first signal by adding a positive random white noise to the temporal feature matrix, and obtaining a second signal by adding a negative random white noise to the temporal feature matrix;

obtaining a first intrinsic mode function by performing empirical mode decomposition on the first signal, and obtaining a second intrinsic mode function by performing empirical mode decomposition on the second signal; and obtaining the target decomposition result by performing equalization processing on the first intrinsic mode function and the second intrinsic mode function.

According to the fuel cell fault diagnosis method according to the present disclosure, obtaining the high-dimensional mapping vector by processing the spatial feature data using the kernel principal component analysis includes:
- constructing a kernel matrix according to the spatial feature data;
- determining each eigenvalue of the centralized matrix by performing centralized processing on the kernel matrix;
- determining descending eigenvalues and a descending eigenvector corresponding to each descending eigenvalue by arranging each eigenvalue of the centralized matrix in a descending order; and
- determining the high-dimensional mapping vector according to each eigenvalue of the centralized matrix and the eigenvectors after descending.

According to the fuel cell fault diagnosis method according to the present disclosure, obtaining the spatial feature to be synchronized by processing the high-dimensional mapping vector according to the preset cumulative variance contribution includes:
- determining the preset cumulative variance contribution according to variance contributions of all the descending eigenvalues;
- determining a target selection parameter according to the preset cumulative variance contribution and a preset confidence interval;
- determining the spatial feature to be synchronized according to a first principal component in a first position and a second principal component in a second position in the high-dimensional mapping vector in a case that the target selection parameter is less than or equal to a preset selection parameter; and
- determining the spatial feature to be synchronized according to the first principal component in the first position and a second equivalent principal component of the high-dimensional mapping vector in a case that the target selection parameter is greater than the preset selection parameter; wherein the second equivalent principal component is determined according to a following formula:

$$Y_2^* = \frac{Y_2 \lambda_2}{\lambda_2 + \ldots + \lambda_m} + \ldots + \frac{Y_m \lambda_m}{\lambda_2 + \ldots + \lambda_m}$$

where $Y_2^*$ is the second equivalent principal component, $Y_2$ is the second principal component in the second position, $\lambda_2$ is a descending eigenvalue in the second position, $Y_m$ is a principal component in a last position, and $\lambda_m$ is a descending eigenvalue in the last position.

According to the fuel cell fault diagnosis method according to the present disclosure, obtaining the temporal feature to be synchronized by processing the target decomposition result according to the lumped fuzzy entropy operation includes:
- obtaining a reconstructed intrinsic mode function by reconstructing the target decomposition result, and determining a preset threshold function according to the reconstructed intrinsic mode function; and
- obtaining the temporal feature to be synchronized by processing the preset threshold function according to the fuzzy entropy operation; wherein
- obtaining the temporal feature to be synchronized by processing the preset threshold function according to the fuzzy entropy operation includes:

$$FE(m, r, h) = \lim_{N \to \infty} \left( \ln \phi^m(h, r) - \ln \phi^{m+1}(h, r) \right) = F_T$$

where $F_T$ is the temporal feature to be synchronized, $\ln \phi^m(n, r)$ is the preset threshold function, m is a dimension, r is a boundary width, and h is a boundary gradient.

According to the fuel cell fault diagnosis method according to the present disclosure, before inputting the synchronous spatial-temporal feature into the preset diagnosis model, the method further includes:
- inputting the spatial-temporal synchronization feature samples and the health state label corresponding to each spatial-temporal synchronization feature sample to a least-square support vector machine, and obtaining the preset diagnosis model by optimizing a regularization parameter and a kernel parameter using a grid search.

According to the fuel cell fault diagnosis method according to the present disclosure, before determining the sensor weight corresponding to each sensor according to each amount of information contained in all the sensors in the fuel cell to be diagnosed, the method further includes:
- determining the correlation between the data of any two sensors of all the sensors and the contrast:

$$\begin{cases} r_{ij} = \frac{\text{cov}(x_i, x_j)}{\delta_i \delta_j} \\ D_i = \sqrt{\frac{1}{k-1} \sum_{c=1}^{k} (x_{ic} - \bar{x}_i)^2} \end{cases}$$

where k is a total number of samples of the sensors, $x_i, x_j$ are data of an $i^{th}$ and $j^{th}$ sensors respectively, $r_{ij}$ is the correlation between the data of any two sensors, $\delta_i$ and $\delta_j$ are corresponding standard deviations, $X_{ic}$ is a $c^{th}$ datum of the $i^{th}$ sensor, $\bar{x}_i$ is an average value of the $i^{th}$ sensor, and $D_i$ is the contrast between the data of any one sensor.

According to the fuel cell fault diagnosis method according to the present disclosure, after determining the sensor weight corresponding to each sensor, the method further includes:
- determining sensor data corresponding to all sensors having sensor weights less than or equal to the second preset weight as redundant data, and eliminating the redundant data.

In a second aspect, a fuel cell fault diagnosis system is provided, including a fuel cell fault diagnosis apparatus and one or more fuel cells to be diagnosed, wherein the fuel cell fault diagnosis apparatus includes:
- a preprocessing unit, configured to determine a sensor weight corresponding to each sensor according to each amount of information contained in all sensors in the fuel cell to be diagnosed, determine sensor data corresponding to all sensors having sensor weights greater than a first preset weight as temporal feature data, and determine sensor data corresponding to all sensors having sensor weights greater than a second preset weight as spatial feature data, wherein the first preset weight is greater than the second preset weight;
- a feature extraction unit, configured to perform a temporal feature extraction on the temporal feature data according to a preset time series, obtain a temporal feature matrix using a data interpolation, and obtain a target decomposition result by performing empirical mode decomposition on the temporal feature matrix using a complementary set; and obtain a high-dimensional mapping vector by processing the spatial feature data using a kernel principal component analysis;

a fusion unit, configured to obtain a spatial feature to be synchronized by processing the high-dimensional mapping vector according to a preset cumulative variance contribution, obtaining a temporal feature to be synchronized by processing the target decomposition result according to a lumped fuzzy entropy operation, and obtaining a synchronous spatial-temporal feature by fusing the spatial feature to be synchronized and the temporal feature to be synchronized; and a diagnosis unit, configured to obtain a fault diagnosis result of the fuel cell to be diagnosed output by a preset diagnosis model by inputting the synchronous spatial-temporal feature into the preset diagnosis model; wherein Each amount of the information contained in all the sensors is determined according to correlation between data of any two sensors of all the sensors and a contrast.

The preset diagnosis model is obtained after training according to all spatial-temporal synchronization feature samples and a health state label corresponding to each spatial-temporal synchronization feature sample.

The present disclosure provides the fuel cell fault diagnosis method and system. Key parameters are extracted from all sensor data in the fuel cell to be diagnosed according to the sensitivity analysis. The spatial-temporal fault features of the fuel cell to be diagnosed are extracted by the kernel principal component analysis and the complementary ensemble empirical mode decomposition, respectively. Spatial-temporal feature synchronization is realized using the cumulative variance contribution and a lumped fuzzy entropy. Spatial-temporal synchronization fault features are diagnosed by designing a classifier based on a least-square support vector machine, and finally the fault diagnosis result of the fuel cell to be diagnosed is obtained. In the present disclosure, not only a fault state of the fuel cell can be accurately diagnosed, but also a calculation cost is low, so that a low-cost high-precision fuel cell fault diagnosis is realized.

BRIEF DESCRIPTION OF DRAWINGS

In order to explain technical solutions in the present disclosure or the prior art more clearly, accompanying drawings that need to be used in descriptions of embodiments or the prior art will be briefly introduced below. Apparently, the accompanying drawings in the following descriptions are some embodiments of the present disclosure, and it would have been obvious for a person of ordinary skill in the art to obtain other drawings according to these drawings without involving any inventive effort.

DETAILED DESCRIPTION OF THE EMBODIMENTS

In order to make an objective, technical schemes and advantages of the present disclosure clearer, the technical schemes in the present disclosure will be clearly and completely described below in combination with accompanying drawings in the present disclosure. Apparently, described embodiments are part of embodiments of the present disclosure, not all of them. Based on the embodiments in the present disclosure, all other embodiments obtained by those of ordinary skill in the art without inventive effort shall fall within the protection scope of the present disclosure.

Figure 1:
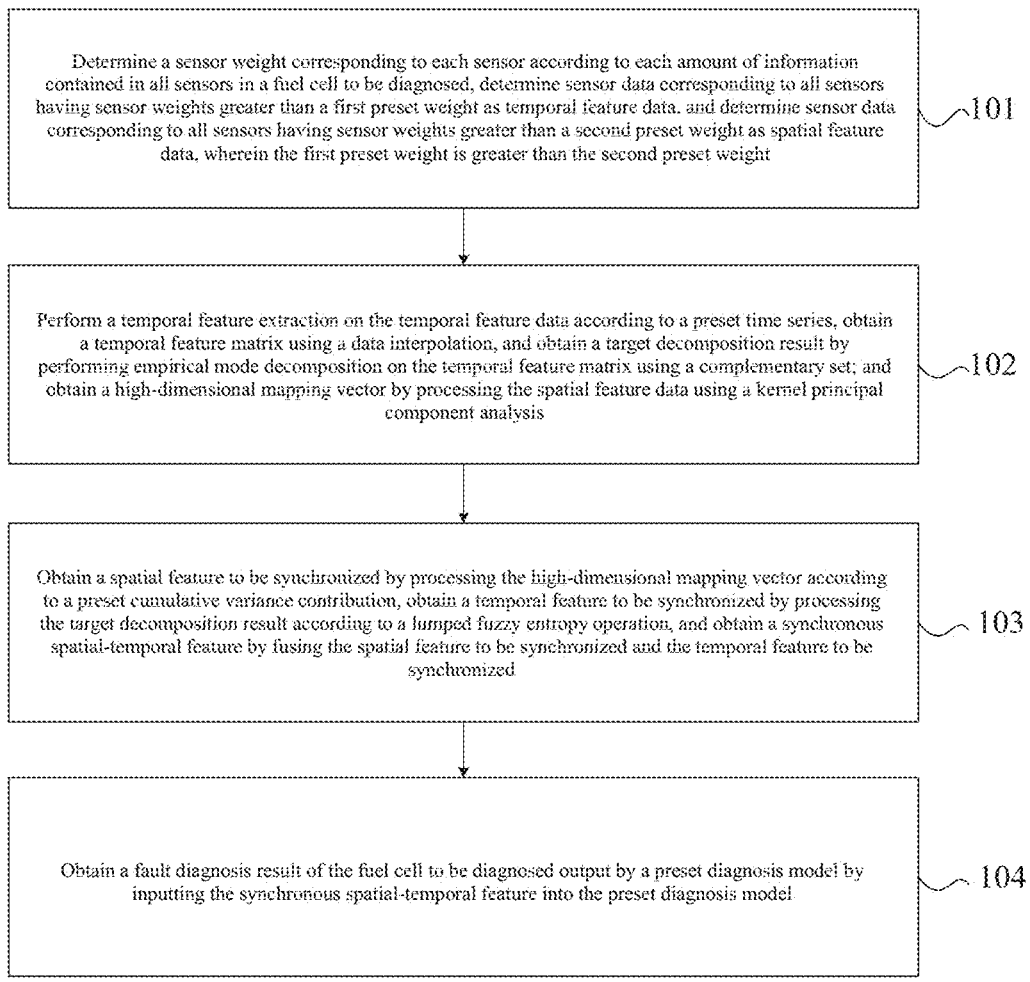
FIG. 1 is a first schematic flowchart of a fuel cell fault diagnosis method according to the present disclosure.

FIG. 1 is a first schematic flowchart of a fuel cell fault diagnosis method according to the present disclosure. The fuel cell fault diagnosis method includes:

Step 101, a sensor weight corresponding to each sensor is determined according to each amount of information contained in all sensors in a fuel cell to be diagnosed, sensor data corresponding to all sensors having sensor weights greater than a first preset weight are determined as temporal feature data, and sensor data corresponding to all sensors having sensor weights greater than a second preset weight are determined as spatial feature data, wherein the first preset weight is greater than the second preset weight.

Step 102, a temporal feature extraction is performed on the temporal feature data according to a preset time series, a temporal feature matrix is obtained using a data interpolation, and a target decomposition result is obtained by performing complementary ensemble empirical mode decomposition on the temporal feature matrix; and a high-dimensional mapping vector is obtained by processing the spatial feature data using a kernel principal component analysis.

Step 103, a spatial feature to be synchronized is obtained by processing the high-dimensional mapping vector according to a preset cumulative variance contribution, a temporal feature to be synchronized is obtained by processing the target decomposition result according to a lumped fuzzy entropy operation, and a synchronous spatial-temporal feature is obtained by fusing the spatial feature to be synchronized and the temporal feature to be synchronized.

Step 104, a fault diagnosis result of the fuel cell to be diagnosed output by the preset diagnosis model is obtained by inputting the synchronous spatial-temporal feature into a preset diagnosis model.

Each amount of the information contained in all the sensors is determined according to correlation between data of any two sensors of all the sensors and a contrast.

The preset diagnosis model is obtained after training according to all spatial-temporal synchronization feature samples and a health state label corresponding to each spatial-temporal synchronization feature sample.

In step 101, the present disclosure is mainly directed to a PEMFC system as a fault diagnosis object. The PEMFC system consists of an air supply subsystem, a hydrogen supply subsystem, and a temperature management subsystem. The subsystems work together to supply power to a load. Parameters such as flow and pressure are periodically sampled in a system running process, and the key to effectively diagnosing a fault of the PEMFC system is to collect and utilize sufficient information from data of a plurality of sensors. Therefore, in the present disclosure, each amount of information contained in all the sensors in the fuel cell to be diagnosed needs to be obtained.

Optionally, determining the sensor weight corresponding to each sensor according to each amount of information contained in all the sensors in the fuel cell to be diagnosed includes a following formula:

$$W_i = C_i / \sum\nolimits_{c=1}^{n} C_i \qquad (1)$$

where $C_i = D_i \Sigma_{j=1}^{n}(1-r_{ij})$ is the amount of information contained in an $i_{th}$. sensor, $r_{ij}$ is correlation between data of any two sensors, and $D_i$ is a contrast between data of any one sensor.

Optionally, the key to effectively diagnosing the fault of the PEMFC system is to collect and utilize sufficient information from the data of the plurality of sensors. However, not every dimension of data is necessary for the fault diagnosis, and some data may even have side effects due to a sampling noise. Therefore, full-dimensional sensor data will produce computational redundancy. In order to overcome this technical defect, in the present disclosure, a sensor parameter that is most suitable for the temporal feature extraction and a sensor parameter that is most suitable for the spatial feature extraction are pre-selected by introducing parameter consideration dimensions of correlation and contrast.

Before determining the sensor weight corresponding to each sensor according to each amount of information contained in all the sensors in the fuel cell to be diagnosed, the method further includes:

determining the correlation between the data of any two sensors of all the sensors and the contrast:

$$\begin{cases} r_{ij} = \dfrac{\mathrm{cov}(x_i, x_j)}{\delta_i \delta_j} \\ D_i = \sqrt{\dfrac{1}{k-1} \sum\limits_{k}^{c=1}(x_{ic} - \bar{x}_i)^2} \end{cases} \qquad (2)$$

where k is a total number of samples of the sensors, $x_i, x_j$ are data of an $i^{th}$ and $j^{th}$ sensors respectively, $r_{ij}$ is the correlation between the data of any two sensors, $\delta_i$ and $\delta_j$ are corresponding standard deviations, $x_{ic}$ is a $c^{th}$ datum of the $i^{th}$ sensor, $\bar{x}_i$ is an average value of the $i^{th}$ sensor, and $D_i$ is the contrast between the data of any one sensor.

After the correlation between the data of any two sensors of all the sensors and the contrast are determined, the sensor weight corresponding to each sensor is determined according to the formula in (1). Then, in the present disclosure, the key parameters of the spatial-temporal features need to be screened by considering spatial-temporal limit weights and different fault states.

Specifically, the sensor data corresponding to all sensors having sensor weights greater than the first preset weight as the temporal feature data. The sensor data corresponding to all sensors having sensor weights greater than the second preset weight are determined as the spatial feature data. The first preset weight is greater than the second preset weight. From the level of data volume, the spatial feature data contain the temporal feature data, that is, the temporal feature data can be used not only for the temporal feature extraction, but also for the spatial feature extraction, but a part of the spatial feature data used for the spatial feature extraction cannot be used for the temporal feature extraction.

Optionally, after determining the sensor weight corresponding to each sensor, the sensor data corresponding to all sensors having sensor weights less than or equal to the second preset weight are determined as redundant data, and the redundant data are eliminated. Then a calculation cost of a fault state of the fuel cell is reduced, and a low-cost high-precision fuel cell fault diagnosis is realized.

In step 102, the temporal feature extraction is performed on the temporal feature data according to the preset time series, the temporal feature matrix is obtained using the data interpolation, and the target decomposition result is obtained by performing the complementary ensemble empirical mode decomposition. The high-dimensional mapping vector is obtained by processing the spatial feature data using the kernel principal component analysis.

Optionally, in the present disclosure, a corresponding $m_1$ dimensional sensor parameter is used for the temporal feature extraction, a time series of a preset duration is adopted as the sliding window of the temporal feature extraction, and a temporal feature matrix $10T \times m_1$ is obtained by adopting the data interpolation to adjacent data points.

Optionally, "obtaining the target decomposition result by performing the complementary ensemble empirical mode decomposition on the temporal feature matrix" includes for the $10T \times m_1$ dimensional temporal feature matrix obtained by data pre-selection, the empirical mode decomposition is performed with the complementary set to obtain a data temporal feature:

$$T = \begin{bmatrix} s_{1,1} & \cdots & s_{1,m_1} \\ \vdots & \ddots & \vdots \\ s_{100,1} & \cdots & s_{100,m_1} \end{bmatrix} = (T(1), T(2), \ldots, T(10T))^T \qquad (3)$$

The target decomposition result $IMF_s$ is obtained according to formula (3).

Optionally, "obtaining the high-dimensional mapping vector by processing the spatial feature data using the kernel principal component analysis" includes adopting the kernel principal component analysis to an $m_2$ dimensional sensor parameter S $$S = (S_1, S_2, \ldots, S_{m_2}) = \begin{bmatrix} s_{1,1} & \cdots & s_{1,m_2} \\ \vdots & \ddots & \vdots \\ s_{N,1} & \cdots & s_{N,m_2} \end{bmatrix}, (S_k \in R^n, k = 1, 2, \ldots, m_2)$$

obtained by data pre-selection so as to extract a data high-dimensional kernel spatial feature, and a high-dimensional mapping vector $Y_k$ is obtained.

In step 103, the present disclosure adopts different processing modes to specifically process the high-dimensional mapping vector and the target decomposition result. For the synchronization of spatial features, the high-dimensional mapping vector is processed adopting the preset cumulative variance contribution, and the spatial feature to be synchronized $[F_{S1}, F_{S2}]$ is determined selecting a form of a principal component. For the synchronization of temporal features, the target decomposition result is processed according to the lumped fuzzy entropy operation, the lumped fuzzy entropy operation is adopted for an intrinsic mode function, and the temporal feature to be synchronized $F_T$ is obtained.

Optionally, obtaining the temporal feature to be synchronized by processing the target decomposition result according to the lumped fuzzy entropy operation includes:

obtaining a reconstructed intrinsic mode function by reconstructing the target decomposition result, and determining a preset threshold function according to the reconstructed intrinsic mode function; and obtaining the temporal feature to be synchronized by processing the preset threshold function according to the fuzzy entropy operation.

Optionally, in the present disclosure, the target decomposition result, i.e., an intrinsic mode function $IMF_i(t)(t=1, 2, \ldots, 10T)$, is reconstructed. After reconstruction, the intrinsic mode function is expressed as:

$$IMF_i^m = u(t), u(t+1), \ldots, u(t+m-1) - u_0(t), \quad (4)$$

$$t = 1, 2, \ldots, 10T+1-m_1,$$

where $$u_0(t) = \frac{1}{m}\sum_{q=0}^{m-1} u(t+q).$$

Further, the preset threshold function is determined according to the reconstructed intrinsic mode function, and the threshold function $\phi^n$ is defined:

$$\phi^m(n, r) = \frac{1}{N-m}\sum_{i=1}^{N-m}\left(\frac{1}{N-m-1}\sum_{\substack{j=1\\j\neq i}}^{N-m} D_{ij}^m\right) \quad (5)$$

where $D_{ij}^m$ is a similarity between $IMF_j^m$ and $IMF_j^m$, calculated from a fuzzy function $\mu(d_{ij}^m,n,r)=\exp(-(d_{ij}^m/r)^n)$, and $$d_{ij}^m = d[X_i^m, X_j^m] = \max_{k\in(0,m-1)}\{|[u(i+k) - u_0(i)] -$$

is a maximum absolute difference of a $$[u(j+k) - u_0(j)]|\}$$

corresponding scalar component.

obtaining the temporal feature to be synchronized by processing the preset threshold function according to the fuzzy entropy operation includes:

$$FE(m, r, h) = \lim_{N\to\infty}\left(\ln\phi^m(h, r) - \ln\phi^{m+1}(h, r)\right) = F_T \quad (6)$$

where $F_T$ is the temporal feature to be synchronized, In $\phi^m(n,r)$ is the preset threshold function, m is a dimension, r is a boundary width, and h is a boundary gradient.

Optionally, the high-dimensional mapping vector obtained by the kernel principal component analysis meets $Y_k\varepsilon R^{1\times m2}$, but an eigenfunction obtained by the empirical mode decomposition of the complementary set meets $IMF_i \varepsilon R^{10T\times 1}$, so it is necessary to synchronize the spatial-temporal fault features to realize the subsequent fault diagnosis. The spatial feature to be synchronized and the temporal feature to be synchronized are considered comprehensively, and a synchronous spatial-temporal feature $F_{ST}=[F_{S1},F_{S2},F_T]$ is obtained by fusing the spatial feature to be synchronized and the temporal feature to be synchronized.

In step 104 of the present disclosure, the fault diagnosis result of the fuel cell to be diagnosed output by the preset diagnosis model is obtained by inputting the synchronous spatial-temporal feature into the preset diagnosis model. The preset diagnosis model is obtained after training according to all spatial-temporal synchronization feature samples and a health state label corresponding to each spatial-temporal synchronization feature sample.

Optionally, the spatial-temporal synchronization feature sample includes a first sample set, a second sample set, a third sample set, a fourth sample set, and a fifth sample set.

The health state labels include a steady-state label corresponding to the first sample set, a membrane-dry transition state label corresponding to the second sample set, a membrane-dry label corresponding to the third sample set, a hydrogen leakage transition state label corresponding to the fourth sample set, and a hydrogen leakage label corresponding to the fifth sample set.

Before inputting the synchronous spatial-temporal feature into the preset diagnosis model, the method further includes:

inputting the spatial-temporal synchronization feature samples and the health state label corresponding to each spatial-temporal synchronization feature sample to a least-square support vector machine, and obtaining the preset diagnosis model by optimizing a regularization parameter and a kernel parameter using a grid search.

For an N-dimensional training datum $(x_1,y_1), 1=1, 2, \ldots, N$, where $x_1=(x_1^{\ 1}, x_1^{\ 2}, x_1^{\ 3})\in R^3$ is an input spatial-temporal synchronization feature, and $y_1 \in R$ is a corresponding health state label. In order to map an input space to a feature space, a nonlinear function $\varphi(x)$ is adopted to construct a least-square support vector machine model:

$$f(x) = \varepsilon^T\varphi(x) + b \quad (7)$$

where $\varepsilon$ and are a weight and a bias.

In the least-square support vector machine (LSSVM), a risk of structuring is minimized often using a least square method, thus transforming an evaluation problem into an optimization problem that minimizes an objective function. The objective function consists of two parts: one is a fitting error of the model on training data, that is, an empirical risk; and the second is a regularization term, which is used for controlling the complexity of the model. By adjusting the parameters of the model, such as the selection of kernel functions and the adjustment of regularization parameters, the model may be simplified as much as possible while maintaining a good fit, so as to prevent the occurrence of an overfitting phenomenon. The evaluation problem is transformed into an optimization problem:

$$\begin{cases} \min J(\varepsilon, \lambda) = \min \frac{1}{2}\left(\varepsilon^T\varepsilon + \gamma\sum_{i=1}^N e_i^2\right) \\ \text{s.t. } y_l = \varepsilon^T\varphi(x) + b + e_l \end{cases} \quad (8)$$

where $e_1$ is an error term, and $\gamma$ is a regularization parameter.

The above optimization process is as follows.
First, a Lagrangian function is constructed:

$$L(\varepsilon, b, e, \alpha) = \frac{1}{2}\omega^T\omega + \frac{1}{2}\gamma\sum_{i=1}^N e_i^2 - \sum_{i=1}^N \alpha_i\{\omega^T\phi(x_i) + b + e_i - y_i\} \quad (9)$$

where $\alpha_i (i=1,2,\ldots, N)$ is a Lagrangian multiplier.

By solving a partial derivative of $\varepsilon, b, e, \alpha$, a least-square support vector machine model under an optimal solution condition may be obtained as:

$$a) \quad y(x) = \sum_{I=1}^{N} \alpha_i K(x_I, x) + b \quad (10)$$

where $$K(x_I, x) = \exp\left(\frac{//x_I - x//}{2\sigma^2}\right)^2$$

is a kernel function, $\sigma$ is a kernel parameter, and the regularization parameter and the kernel parameter are optimized using a grid search.

In an optional embodiment, a dataset is collected by a sensor during a real running process of the fuel cell system, its sampling frequency is 1 Hz, and the dataset is divided into five running states: steady state (N), membrane-dry transition state (T1), membrane-dry (F1), hydrogen leakage transition state (T2), and hydrogen leakage (F2). The data distribution of a training set and a test set for each running state is shown in following Table 1:

TABLE 1

|  | N | T1 | F1 | T2 | F2 | Total |
|---|---|---|---|---|---|---|
| Training | 800 | 240 | 420 | 600 | 400 | 2660 |
| Test | 364 | 101 | 161 | 250 | 133 | 1010 |

The embodiment is implemented based on an MATLAB simulation platform, and algorithm hyperparameters are shown in following Table 2:

TABLE 2

| Method | Hyperparameter | Value |
|---|---|---|
| Kernel principal component analysis | Kernel | 'Gaussian' |
|  | Gaussian parameter | 2 |
|  | Polynomial constant | 2.5 |
|  | Polynomial degree | 'Auto Scale' |
| Empirical mode decomposition of a complementary set | Add a standard deviation of a noise | 0.2 |
|  | Mode number | 100 |
| Fuzzy entropy | Boundary width | 0.2 |
|  | Boundary gradient | 2 |
|  | Dimension | 2 |
| Least-square support vector machine | Kernel | 'RBF' |
|  | Regularization parameter | 256 |
|  | Kernel parameter | 0.125 |
| Grid search | Search strategy | 'index' |
|  | First exponential sequence | $2^{-8}, 2^{-7}, \ldots 2^7, 2^8$ |
|  | Second exponential sequence | $2^{-8}, 2^{-7}, \ldots 2^7, 2^8$ |

The present disclosure provides the fuel cell fault diagnosis method. Key parameters are extracted from all sensor data in the fuel cell to be diagnosed according to the sensitivity analysis. The spatial-temporal fault features of the fuel cell to be diagnosed are extracted by the kernel principal component analysis and the complementary ensemble empirical mode decomposition, respectively. Spatial-temporal feature synchronization is realized using the cumulative variance contribution and a lumped fuzzy entropy. Spatial-temporal synchronization fault features are diagnosed by designing a classifier based on a least-square support vector machine, and finally the fault diagnosis result of the fuel cell to be diagnosed is obtained. In the present disclosure, not only a fault state of the fuel cell can be accurately diagnosed, but also a calculation cost is low, so that a low-cost high-precision fuel cell fault diagnosis is realized.

Figure 2:
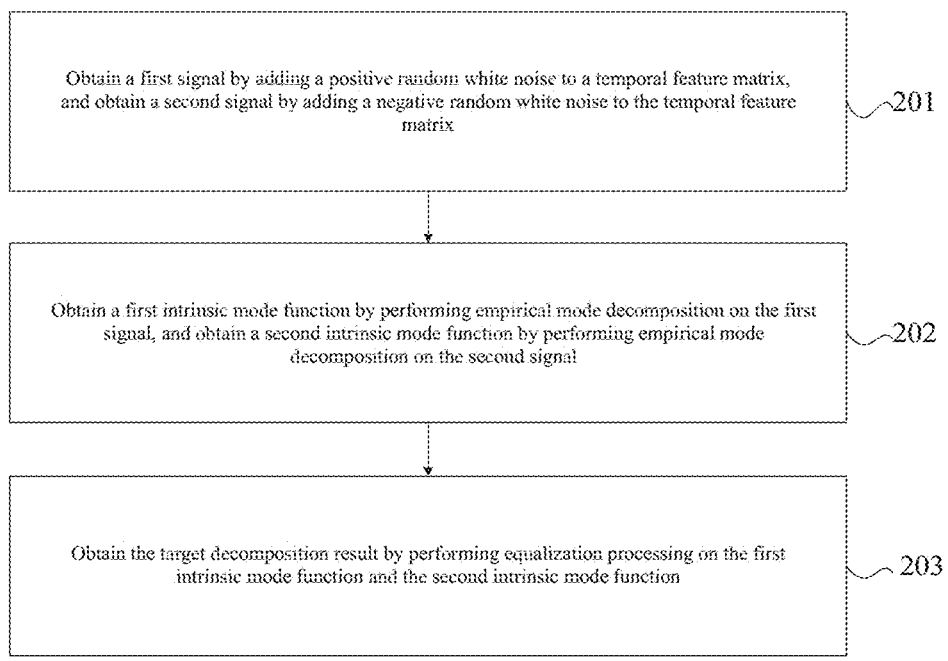
FIG. 2 is a second schematic flowchart of a fuel cell fault diagnosis method according to the present disclosure.

FIG. 2 is a second schematic flowchart of a fuel cell fault diagnosis method according to the present disclosure. Obtaining the target decomposition result by performing the complementary ensemble empirical mode decomposition on the temporal feature matrix:

Step 201, a first signal is obtained by adding a positive random white noise to the temporal feature matrix, and a second signal is obtained by adding a negative random white noise to the temporal feature matrix.

Step 202, a first intrinsic mode function is obtained by performing empirical mode decomposition on the first signal, and a second intrinsic mode function is obtained by performing empirical mode decomposition on the second signal.

Step 203, the target decomposition result is obtained by performing equalization processing on the first intrinsic mode function and the second intrinsic mode function.

In step 201, two pairs of positive and negative random white noises $n(t)=(n_1(t), n_2(t), \ldots, n_{m1}(t))$ are added to an original time series $T(t)$, an average value thereof is 0, a variance is equal to an original signal, and the following two sets of signals may be obtained:

$$\begin{cases} T^+(t) = T(t) + n(t) \\ T^-(t) = T(t) - n(t) \end{cases} \quad (11)$$

In step 202, two sets of intrinsic mode functions: the first intrinsic mode function $IMFs^+$ and the second intrinsic mode function $IMFs^-$ are obtained by adopting empirical mode decomposition for the first signal $T^+(t)$ and the second signal $T^-(t)$.

In step 203, the target decomposition result $IMF_s$ is obtained by performing equalization processing on the first intrinsic mode function $IMFs^+$ and the second intrinsic mode function $IMFs^-$.

Figure 3:
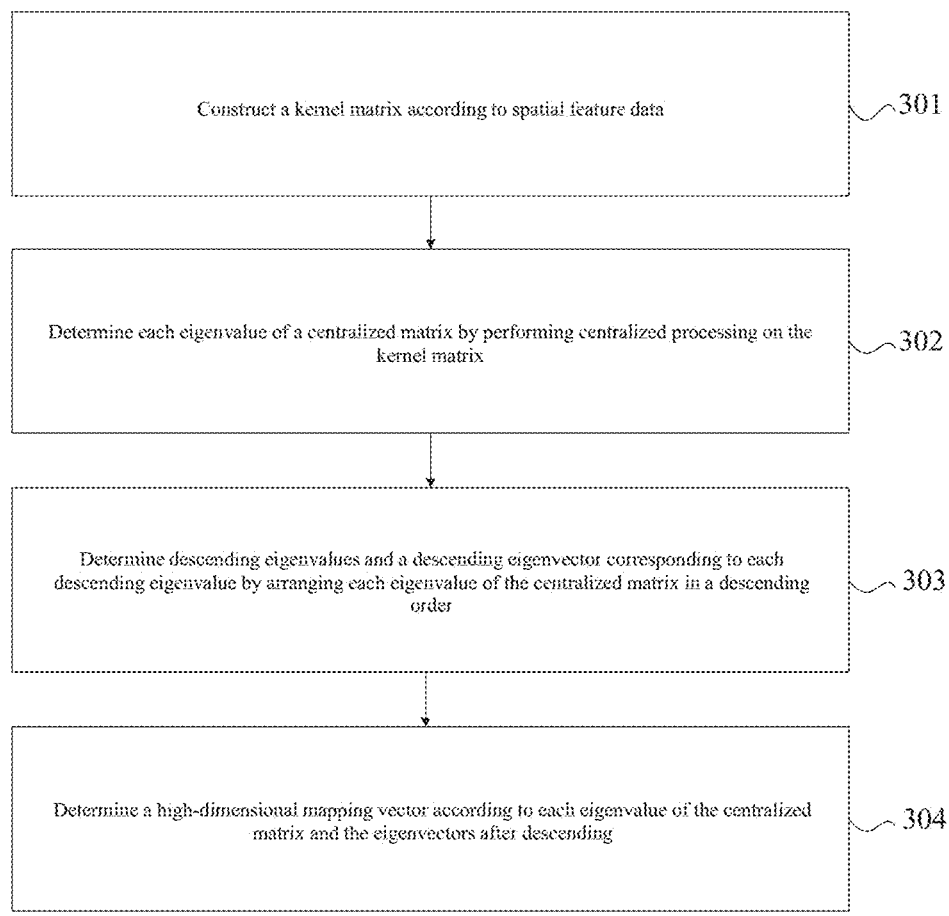
FIG. 3 is a third schematic flowchart of a fuel cell fault diagnosis method according to the present disclosure.

FIG. 3 is a third schematic flowchart of a fuel cell fault diagnosis method according to the present disclosure. Obtaining the high-dimensional mapping vector by processing the spatial feature data using the kernel principal component analysis includes:

Step 301, a kernel matrix is constructed according to the spatial feature data.

Step 302, each eigenvalue of a centralized matrix is determined by performing centralized processing on the kernel matrix.

Step 303, descending eigenvalues and a descending eigenvector corresponding to each descending eigenvalue are determined by arranging each eigenvalue of the centralized matrix in a descending order.

Step 304, the high-dimensional mapping vector is determined according to each eigenvalue of the centralized matrix and the eigenvectors after descending.

In step 301, a $S \times m_2$ kernel matrix $K=(k_{ij})i,j=1,2,\ldots,N$ is constructed according to the spatial feature data, where $k_{ij}=k(S_i, S_j)$ is a kernel function RBF.

In step 302, each eigenvalue of the centralized matrix is determined by performing centralized processing on the kernel matrix. Each eigenvalue of the centralized matrix may refer to a following formula:

$$\tilde{K} = K - 1_N K - K 1_N + 1_N K 1_N \qquad (12)$$

where $$1_N = \frac{1}{N}\begin{bmatrix} 1 & \cdots & 1 \\ \vdots & \ddots & \vdots \\ 1 & \cdots & 1 \end{bmatrix}.$$

Step 303, a descending eigenvalue $\lambda=(\lambda_1, \lambda_2, \ldots \lambda_{m2})$ and a descending eigenvector $\alpha_j=(\alpha_1, \alpha_2, \ldots \alpha_{m2})$ corresponding to each descending eigenvalue are determined by arranging each eigenvalue of the centralized matrix in the descending order.

In step 304, the high-dimensional mapping vector $Y_k$ is determined according to each eigenvalue of the centralized matrix and the eigenvectors after descending, which may refer to a following formula:

$$Y_k = \tilde{K}\alpha_k (k = 1, 2, \ldots m_2) \qquad (13)$$

Figure 4:
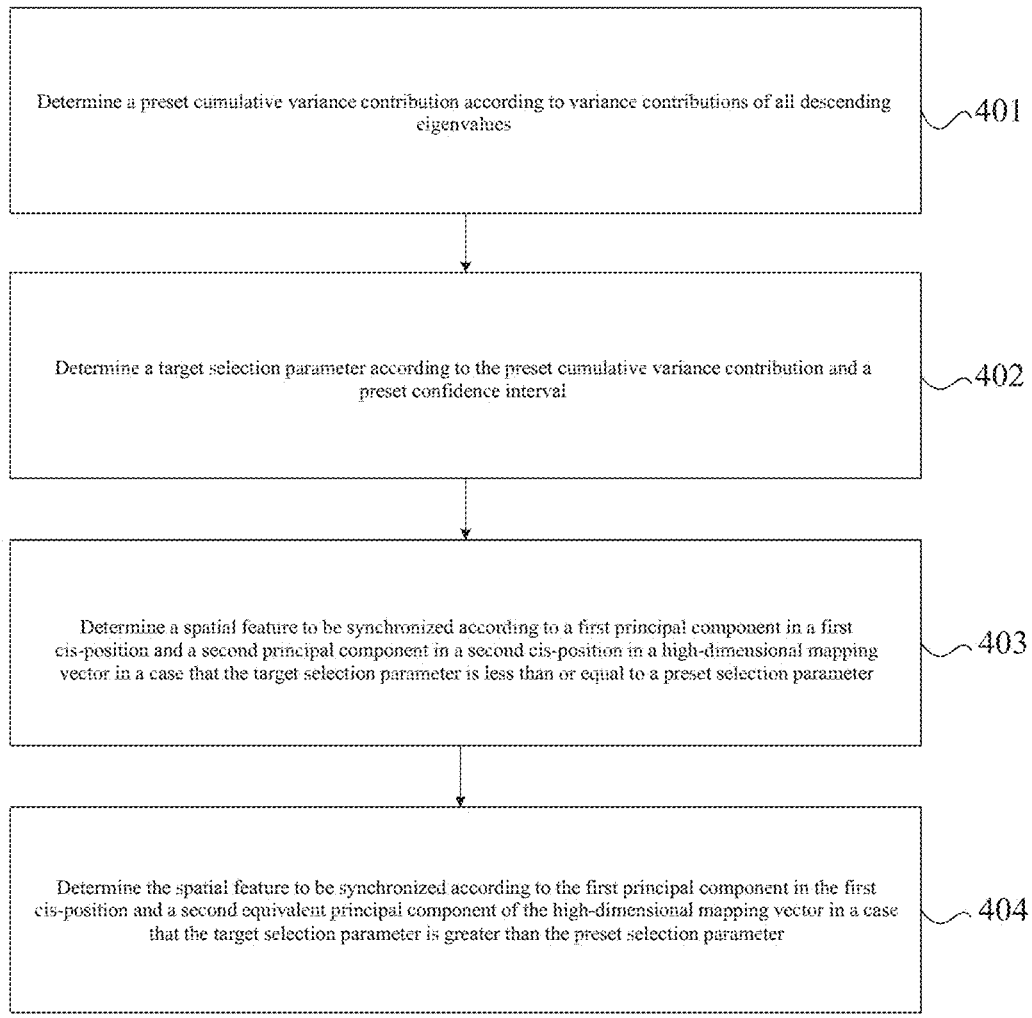
FIG. 4 is a fourth schematic flowchart of a fuel cell fault diagnosis method according to the present disclosure.

FIG. 4 is a fourth schematic flowchart of a fuel cell fault diagnosis method according to the present disclosure. Obtaining the spatial feature to be synchronized by processing the high-dimensional mapping vector according to the preset cumulative variance contribution includes:

Step 401, the preset cumulative variance contribution is determined according to variance contributions of all the descending eigenvalues.

Step 402, a target selection parameter is determined according to the preset cumulative variance contribution and a preset confidence interval.

Step 403, the spatial feature to be synchronized is determined according to a first principal component in a first position and a second principal component in a second position in the high-dimensional mapping vector in a case that the target selection parameter is less than or equal to a preset selection parameter.

Step 404, the spatial feature to be synchronized is determined according to the first principal component in the first position and a second equivalent principal component of the high-dimensional mapping vector in a case that the target selection parameter is greater than the preset selection parameter.

In step 401, for the spatial feature, the variance contribution $\eta_i$ and the cumulative variance contribution $\eta_\Sigma(m)$ are expressed as:

$$\begin{cases} \eta_i = \dfrac{\lambda_i}{\sum_{i=1}^{p}\lambda_i} \\ \eta_\Sigma(m) = \sum_{i=1}^{m}\eta_i \end{cases} \qquad (14)$$

where $\lambda_i$ is a descending eigenvalue.

In step 402, a minimum m for the preset cumulative variance contribution meeting the preset confidence interval $f_\Sigma(m) > \eta_{ref}$ is calculated.

In step 403, the preset selection parameter may be 2, if $m \leq 2$, the first principal component $Y_1$ in the first position and the second principal component $Y_2$ in the second position are selected as spatial features to be synchronized.

In step 404, if $m > 2$, the first principal component $Y_1$ in the first position and the second equivalent principal component $Y_2$ are selected as spatial features to be synchronized, wherein the second equivalent principal component is determined according to a following formula:

$$Y_2^* = \frac{Y_2 \lambda_2}{\lambda_2 + \ldots + \lambda_m} + \ldots + \frac{Y_m \lambda_m}{\lambda_2 + \ldots + \lambda_m} \qquad (15)$$

where $Y_2^*$ is the second equivalent principal component, $Y_2$ is the second principal component in the second position, $\lambda_2$ is a descending eigenvalue in the second position, $Y_m$ is a principal component in a last position, and $\lambda_m$ is a descending eigenvalue in the last position.

The present disclosure provides the fuel cell spatial-temporal synchronization fault diagnosis method. Under the premise of a low training cost, a high-precision fault diagnosis is realized, so that the reliability and durability of the fuel cell are ensured. By designing the fuel cell spatial-temporal synchronization fault diagnosis method, key parameters are extracted by screening the spatial-temporal features according to the sensitivity analysis. The spatial-temporal fault features of the fuel cell are extracted by the kernel principal component analysis and the complementary ensemble empirical mode decomposition, respectively. Spatial-temporal feature synchronization is realized using the cumulative variance contribution and the lumped fuzzy entropy. Spatial-temporal synchronization fault features are diagnosed by designing a classifier based on a least-square support vector machine. In the present disclosure, not only a fault state of the fuel cell can be accurately diagnosed, but also a calculation cost is low, so that a low-cost high-precision fuel cell fault diagnosis is realized.

Figure 5:
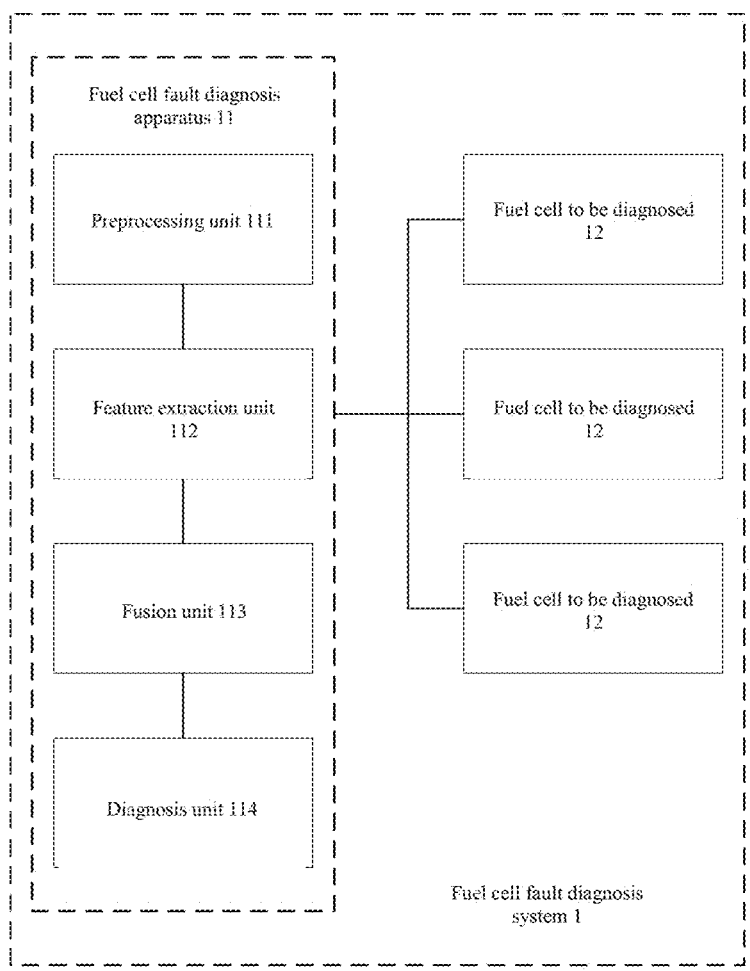
FIG. 5 is a schematic structural diagram of a remote control system according to the present disclosure.

FIG. 5 is a schematic structural diagram of a remote control system according to the present disclosure. A fuel cell fault diagnosis system 1 includes a fuel cell fault diagnosis apparatus 11 and one or more fuel cells to be diagnosed 12. The fuel cell fault diagnosis apparatus 11 includes:

a preprocessing unit 111, configured to determine a sensor weight corresponding to each sensor according to each amount of information contained in all sensors in the fuel cell to be diagnosed, determine sensor data corresponding to all sensors having sensor weights greater than a first preset weight as temporal feature data, and determine sensor data corresponding to all sensors having sensor weights greater than a second preset weight as spatial feature data, wherein the first preset weight is greater than the second preset weight;

a feature extraction unit 112, configured to perform a temporal feature extraction on the temporal feature data according to a preset time series, obtain a temporal feature matrix using a data interpolation, and obtain a target decomposition result by performing empirical mode decomposition on the temporal feature matrix using a complementary set; and obtain a high-dimensional mapping vector by processing the spatial feature data using a kernel principal component analysis;

a fusion unit 113, configured to obtain a spatial feature to be synchronized by processing the high-dimensional mapping vector according to a preset cumulative variance contribution, obtain a temporal feature to be synchronized by processing the target decomposition result according to a lumped fuzzy entropy operation, and obtain a synchronous spatial-temporal feature by fusing the spatial feature to be synchronized and the temporal feature to be synchronized; and a diagnosis unit 114, configured to obtain a fault diagnosis result of the fuel cell to be diagnosed output by a preset diagnosis model by inputting the synchronous spatial-temporal feature into the preset diagnosis model; wherein Each amount of the information contained in all the sensors is determined according to correlation between data of any two sensors of all the sensors and a contrast.

The preset diagnosis model is obtained after training according to all spatial-temporal synchronization feature samples and a health state label corresponding to each spatial-temporal synchronization feature sample.

The present disclosure provides the fuel cell fault diagnosis system. Key parameters are extracted from all sensor data in the fuel cell to be diagnosed according to a sensitivity analysis. The spatial-temporal fault features of the fuel cell to be diagnosed are extracted by the kernel principal component analysis and the empirical mode decomposition with the complementary set respectively. Spatial-temporal feature synchronization is realized using the cumulative variance contribution and a lumped fuzzy entropy. Spatial-temporal synchronization fault features are diagnosed by designing a classifier based on a least-square support vector machine, and finally the fault diagnosis result of the fuel cell to be diagnosed is obtained. In the present disclosure, not only a fault state of the fuel cell can be accurately diagnosed, but also a calculation cost is low, so that a low-cost high-precision fuel cell fault diagnosis is realized.

Figure 6:
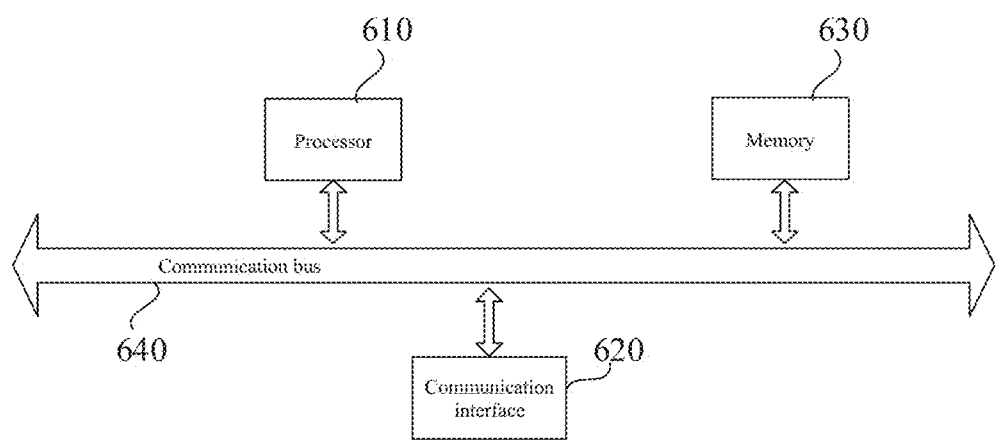
FIG. 6 is a schematic structural diagram of an electronic device according to the present disclosure.

FIG. 6 is a schematic structural diagram of an electronic device according to the present disclosure. As shown in FIG. 6, the electronic device may include: a processor 610, a communication interface 620, a memory 630, and a communication bus 640, wherein the processor 610, the communication interface 620, and the memory 630 complete communications with one another through the communication bus 640. The processor 610 may call logic instructions in the memory 630 to execute a fuel cell fault diagnosis method. The method includes: determining a sensor weight corresponding to each sensor according to each amount of information contained in all sensors in a fuel cell to be diagnosed, determining sensor data corresponding to all sensors having sensor weights greater than a first preset weight as temporal feature data, and determining sensor data corresponding to all sensors having sensor weights greater than a second preset weight as spatial feature data, wherein the first preset weight is greater than the second preset weight; performing a temporal feature extraction on the temporal feature data according to a preset time series, obtaining a temporal feature matrix using a data interpolation, and obtaining a target decomposition result by performing empirical mode decomposition on the temporal feature matrix using a complementary set; obtaining a high-dimensional mapping vector by processing the spatial feature data using a kernel principal component analysis; obtaining a spatial feature to be synchronized by processing the high-dimensional mapping vector according to a preset cumulative variance contribution, obtaining a temporal feature to be synchronized by processing the target decomposition result according to a lumped fuzzy entropy operation, and obtaining a synchronous spatial-temporal feature by fusing the spatial feature to be synchronized and the temporal feature to be synchronized; and obtaining a fault diagnosis result of the fuel cell to be diagnosed output by a preset diagnosis model by inputting the synchronous spatial-temporal feature into the preset diagnosis model. Each amount of the information contained in all the sensors is determined according to correlation between data of any two sensors of all the sensors and a contrast. The preset diagnosis model is obtained after training according to all spatial-temporal synchronization feature samples and a health state label corresponding to each spatial-temporal synchronization feature sample.

In addition, the logic instructions in the above memory 630 may be implemented in the form of software functional units, are sold or used as independent products, and may be stored in a computer readable storage medium. Based on this understanding, the technical scheme of the present disclosure may be embodied in the form of a software product essentially or on the part of contributions to the prior art or part of the technical scheme. The computer software product is stored in a storage medium and includes a plurality of instructions configured to enable a computer device (may be a personal computer, or a server, or a network device, etc.) to execute all or part of the steps of the method of all the embodiments of the present disclosure. The aforementioned storage media include: a USB flash disk, a mobile hard disk, a read-only memory (ROM), a random access memory (RAM), a magnetic disk or an optical disk and other media that can store program codes.

On the other hand, the present disclosure further provides a computer program product, the computer program product includes a computer program, and the computer program may be stored on a non-transient computer readable storage medium. When the computer program is executed by the processor, the computer can execute the fuel cell fault diagnosis method provided by the above methods. The method includes: determining a sensor weight corresponding to each sensor according to each amount of information contained in all sensors in a fuel cell to be diagnosed, determining sensor data corresponding to all sensors having sensor weights greater than a first preset weight as temporal feature data, and determining sensor data corresponding to all sensors having sensor weights greater than a second preset weight as spatial feature data, wherein the first preset weight is greater than the second preset weight; performing a temporal feature extraction on the temporal feature data according to a preset time series, obtaining a temporal feature matrix using a data interpolation, and obtaining a target decomposition result by performing empirical mode decomposition on the temporal feature matrix using a complementary set; obtaining a high-dimensional mapping vector by processing the spatial feature data using a kernel principal component analysis; obtaining a spatial feature to be synchronized by processing the high-dimensional mapping vector according to a preset cumulative variance contribution, obtaining a temporal feature to be synchronized by processing the target decomposition result according to a lumped fuzzy entropy operation, and obtaining a synchronous spatial-temporal feature by fusing the spatial feature to be synchronized and the temporal feature to be synchronized; and obtaining a fault diagnosis result of the fuel cell to be diagnosed output by a preset diagnosis model by inputting the synchronous spatial-temporal feature into the preset diagnosis model. Each amount of the information contained in all the sensors is determined according to correlation between data of any two sensors of all the sensors and a contrast. The preset diagnosis model is obtained after training according to all spatial-temporal synchronization feature samples and a health state label corresponding to each spatial-temporal synchronization feature sample.

On the other hand, the present disclosure further provides a non-transient computer readable storage medium, on which a computer program is stored, and when executed by a processor, the computer program implements the fuel cell fault diagnosis method provided by the above methods. The methods includes: determining a sensor weight corresponding to each sensor according to each amount of information contained in all sensors in a fuel cell to be diagnosed, determining sensor data corresponding to all sensors having sensor weights greater than a first preset weight as temporal feature data, and determining sensor data corresponding to all sensors having sensor weights greater than a second preset weight as spatial feature data, wherein the first preset weight is greater than the second preset weight; performing a temporal feature extraction on the temporal feature data according to a preset time series, obtaining a temporal feature matrix using a data interpolation, and obtaining a target decomposition result by performing empirical mode decomposition on the temporal feature matrix using a complementary set; obtaining a high-dimensional mapping vector by processing the spatial feature data using a kernel principal component analysis; obtaining a spatial feature to be synchronized by processing the high-dimensional mapping vector according to a preset cumulative variance contribution, obtaining a temporal feature to be synchronized by processing the target decomposition result according to a lumped fuzzy entropy operation, and obtaining a synchronous spatial-temporal feature by fusing the spatial feature to be synchronized and the temporal feature to be synchronized; and obtaining a fault diagnosis result of the fuel cell to be diagnosed output by a preset diagnosis model by inputting the synchronous spatial-temporal feature into the preset diagnosis model. Each amount of the information contained in all the sensors is determined according to correlation between data of any two sensors of all the sensors and a contrast. The preset diagnosis model is obtained after training according to all spatial-temporal synchronization feature samples and a health state label corresponding to each spatial-temporal synchronization feature sample.

The apparatus embodiment described above is only illustrative. Units described as separate components may or may not be physically separated, and the components displayed as units may or may not be physical units, that is, they may be located in one place, or they may be distributed onto a plurality of network units. Some or all of the modules can be selected according to actual needs to realize the purpose of the scheme of the embodiment. Those of ordinary skill in the art may understand and implement it without involving any inventive effort.

Through the description of the above implementation, those of skill in the art can clearly understand that each implementation can be realized by means of software plus a necessary general hardware platform, and of course, it can also be realized by hardware. Based on the understandings, the above technical scheme can be embodied in the form of a software product essentially or on the part of contributions to the prior art. The computer software product may be stored in a computer readable storage medium, such as the ROM/RAM, the magnetic disc and the optical disc, and includes a plurality of instructions configured to enable a computer device (may be a personal computer, a server or a network device, etc.) to execute the methods described in various embodiments or some parts of the embodiments.

Finally, it should be noted that: the above embodiments are only used to illustrate the technical scheme of the present disclosure, not to limit it. Although the present disclosure has been described in detail with reference to the above embodiments, those of ordinary skill in the art should understand that: they can still modify the technical scheme recorded in the above embodiments or make equivalent replacement for some of the technical features; and these modifications or replacements do not separate the essence of the corresponding technical scheme from the spirit and scope of the technical scheme of the embodiments of the present disclosure.

What is claimed is:

1. A fuel cell fault diagnosis method, comprising:
determining a sensor weight corresponding to each sensor according to an amount of information contained in each of all sensors in a fuel cell to be diagnosed, determining sensor data corresponding to all sensors having sensor weights greater than a first preset weight as temporal feature data, and determining sensor data corresponding to all sensors having sensor weights greater than a second preset weight as spatial feature data, wherein the first preset weight is greater than the second preset weight;

performing a temporal feature extraction on the temporal feature data according to a preset time series, obtaining a temporal feature matrix using a data interpolation, and obtaining a target decomposition result by performing complementary ensemble empirical mode decomposition on the temporal feature matrix; obtaining a high-dimensional mapping vector by processing the spatial feature data using a kernel principal component analysis, wherein the preset time series is a sliding window;

obtaining a spatial feature to be synchronized by processing the high-dimensional mapping vector according to a preset cumulative variance contribution, obtaining a temporal feature to be synchronized by processing the target decomposition result according to a lumped fuzzy entropy operation, and obtaining a synchronous spatial-temporal feature by fusing the spatial feature to be synchronized and the temporal feature to be synchronized; and obtaining a fault diagnosis result of the fuel cell to be diagnosed output by a preset diagnosis model by inputting the synchronous spatial-temporal feature into the preset diagnosis model; wherein the amount of the information contained in each of all the sensors is determined according to correlation between data of any two sensors of all the sensors and a contrast among data of each sensor;

the preset diagnosis model is obtained after training according to all spatial-temporal synchronization feature samples and a health state label corresponding to each spatial-temporal synchronization feature sample;

determining the sensor weight corresponding to each sensor according to the amount of the information contained in each of all the sensors in the fuel cell to be diagnosed, comprising a following formula:

$$W_i = C_i / \sum_{c=1}^{n} C_i$$

where $C_i=\delta_i\Sigma_{j=1}{}^n(1-r_{ij})$ is the amount of information contained in an $i^{th}$ sensor, $r_{ij}$ is correlation between data of the $i^{th}$ sensor and a $j^{th}$ sensor, and $\delta_i$ is a contrast among the data of the $i^{th}$ sensor;

before determining the sensor weight corresponding to each sensor according to the amount of the information contained in each of all the sensors in the fuel cell to be diagnosed, the method further comprises:

determining the correlation between the data of any two sensors of all the sensors and the contrast between the data of each sensor:

$$\begin{cases} r_{ij} = \dfrac{\text{cov}(x_i, x_j)}{\delta_i \delta_j} \\ \delta_i = \sqrt{\dfrac{1}{k-1}\sum_{c=1}^{k}(x_{ic} - \overline{x}_i)^2} \end{cases}$$

where k is a total number of samples of the $i^{th}$ sensor, $x_i x_j$ is the data of the $i^{th}$ and $j^{th}$ sensors respectively, $r_{ij}$ is the correlation between the data of the $i^{th}$ sensor and the $j^{th}$ sensor, $\delta_i$ and $\delta_j$ are standard deviations corresponding to the data of the $i^{th}$ and $j^{th}$ sensors respectively, $x_{ic}$ is a $c^{th}$ datum of the $i^{th}$ sensor, and $\overline{x}_i$ is an average value of the $i^{th}$ sensor;

wherein obtaining the target decomposition result by performing the complementary ensemble empirical mode decomposition on the temporal feature matrix comprises:

obtaining a first signal by adding a positive random white noise to the temporal feature matrix, and obtaining a second signal by adding a negative random white noise to the temporal feature matrix;

obtaining a first intrinsic mode function by performing empirical mode decomposition on the first signal, and obtaining a second intrinsic mode function by performing empirical mode decomposition on the second signal; and obtaining the target decomposition result by performing equalization processing on the first intrinsic mode function and the second intrinsic mode function.

2. The fuel cell fault diagnosis method according to claim 1, wherein obtaining the high-dimensional mapping vector by processing the spatial feature data using the kernel principal component analysis comprises:

constructing a kernel matrix according to the spatial feature data;

determining each eigenvalue of a centralized matrix by performing centralized processing on the kernel matrix;

determining descending eigenvalues and a descending eigenvector corresponding to each descending eigenvalue by arranging each eigenvalue of the centralized matrix in a descending order; and determining the high-dimensional mapping vector according to the centralized matrix and the descending eigenvectors of the centralized matrix.

3. The fuel cell fault diagnosis method according to claim 2, wherein obtaining the spatial feature to be synchronized by processing the high-dimensional mapping vector according to the preset cumulative variance contribution comprises:

determining the preset cumulative variance contribution according to variance contributions of all the descending eigenvalues;

determining a target selection parameter according to the preset cumulative variance contribution and a preset confidence interval;

determining the spatial feature to be synchronized according to a first principal component in a first position and a second principal component in a second position in the high-dimensional mapping vector in a case that the target selection parameter is less than or equal to a preset selection parameter; and determining the spatial feature to be synchronized according to the first principal component in the first position and a second equivalent principal component of the high-dimensional mapping vector in a case that the target selection parameter is greater than the preset selection parameter; wherein the second equivalent principal component is determined according to a following formula:

$$Y_2^* = \frac{Y_2\lambda_2}{\lambda_2 + \ldots + \lambda_m} + \ldots + \frac{Y_m\lambda_m}{\lambda_2 + \ldots + \lambda_m}$$

where $Y^*_2$ is the second equivalent principal component, $Y_2$ is the second principal component in the second position, $\lambda_2$ is a descending eigenvalue in the second position, $Y_m$ is a principal component in a last position, and $\lambda_m$ is a descending eigenvalue in the last position.

4. The fuel cell fault diagnosis method according to claim 1, before inputting the synchronous spatial-temporal feature into the preset diagnosis model, further comprising:

inputting the spatial-temporal synchronization feature samples and the health state label corresponding to each spatial-temporal synchronization feature sample to a least-square support vector machine, and obtaining the preset diagnosis model by optimizing a regularization parameter and a kernel parameter using a grid search.

5. The fuel cell fault diagnosis method according to claim 1, before determining the sensor weight corresponding to each sensor, further comprising:

determining sensor data corresponding to all sensors having sensor weights less than or equal to the second preset weight as redundant data, and eliminating the redundant data.

6. A fuel cell fault diagnosis system, comprising: a fuel cell fault diagnosis apparatus and one or more fuel cells to be diagnosed, wherein the fuel cell fault diagnosis apparatus comprises:

a preprocessing unit, configured to determine a sensor weight corresponding to each sensor according to an amount of information contained in each of all sensors in the fuel cell to be diagnosed, determine sensor data corresponding to all sensors having sensor weights greater than a first preset weight as temporal feature data, and determine sensor data corresponding to all sensors having sensor weights greater than a second preset weight as spatial feature data, wherein the first preset weight is greater than the second preset weight;

a feature extraction unit, configured to perform a temporal feature extraction on the temporal feature data according to a preset time series, obtain a temporal feature matrix using a data interpolation, and obtain a target decomposition result by performing empirical mode decomposition on the temporal feature matrix using a complementary set; and obtain a high-dimensional mapping vector by processing the spatial feature data using a kernel principal component analysis, wherein the preset time series is a sliding window;

a fusion unit, configured to obtain a spatial feature to be synchronized by processing the high-dimensional mapping vector according to a preset cumulative variance contribution, obtaining a temporal feature to be synchronized by processing the target decomposition result according to a lumped fuzzy entropy operation, and obtaining a synchronous spatial-temporal feature by fusing the spatial feature to be synchronized and the temporal feature to be synchronized; and a diagnosis unit, configured to obtain a fault diagnosis result of the fuel cell to be diagnosed output by a preset diagnosis model by inputting the synchronous spatial-temporal feature into the preset diagnosis model; wherein the amount of the information contained in each of all the sensors is determined according to correlation between data of any two sensors of all the sensors and a contrast between data of each sensor;

the preset diagnosis model is obtained after training according to all spatial-temporal synchronization feature samples and a health state label corresponding to each spatial-temporal synchronization feature sample; determining the sensor weight corresponding to each sensor according to the amount of the information contained in each of all the sensors in the fuel cell to be diagnosed comprises a following formula:

$$W_i = C_i / \sum_{c=1}^{n} C_i$$

where $C_i = \delta_i \Sigma_{j=1}^{n}(1-r_{ij})$ is the amount of information contained in an $i^{th}$ sensor, $r_{ij}$ is correlation between data of the $i^{th}$ sensor and a $j^{th}$ sensor, and $\delta_i$ is a contrast between the data of the $i^{th}$ sensor;

before determining the sensor weight corresponding to each sensor according to the amount of the information contained in each of all the sensors in the fuel cell to be diagnosed, the following is further comprised:

determining the correlation between the data of any two sensors of all the sensors and the contrast between the data of each sensor:

$$\begin{cases} r_{ij} = \frac{\text{cov}(x_i, x_j)}{\delta_i \delta_j} \\ \delta_i = \sqrt{\frac{1}{k-1} \sum_{c=1}^{k} (x_{ic} - \overline{x}_i)^2} \end{cases}$$

where k is a total number of samples of the $i^{th}$ sensor, $x_i, x_j$ is the data of the $i^{th}$ and $j^{th}$ sensors respectively, $r_{ij}$ is the correlation between the data of the $i^{th}$ sensor and the $j^{th}$ sensor, $\delta_i$ and $\delta_j$ are standard deviations corresponding to the data of the $i^{th}$ and $j^{th}$ sensors respectively, $x_{ic}$ is a $c^{th}$ datum of the $i^{th}$ sensor, and $\overline{x}_i$ is an average value of the $i^{th}$ sensor;

wherein obtaining the target decomposition result by performing the complementary ensemble empirical mode decomposition on the temporal feature matrix comprises:

obtaining a first signal by adding a positive random white noise to the temporal feature matrix, and obtaining a second signal by adding a negative random white noise to the temporal feature matrix;

obtaining a first intrinsic mode function by performing empirical mode decomposition on the first signal, and obtaining a second intrinsic mode function by performing empirical mode decomposition on the second signal; and obtaining the target decomposition result by performing equalization processing on the first intrinsic mode function and the second intrinsic mode function.

\* \* \* \* \*